Patented June 2, 1931

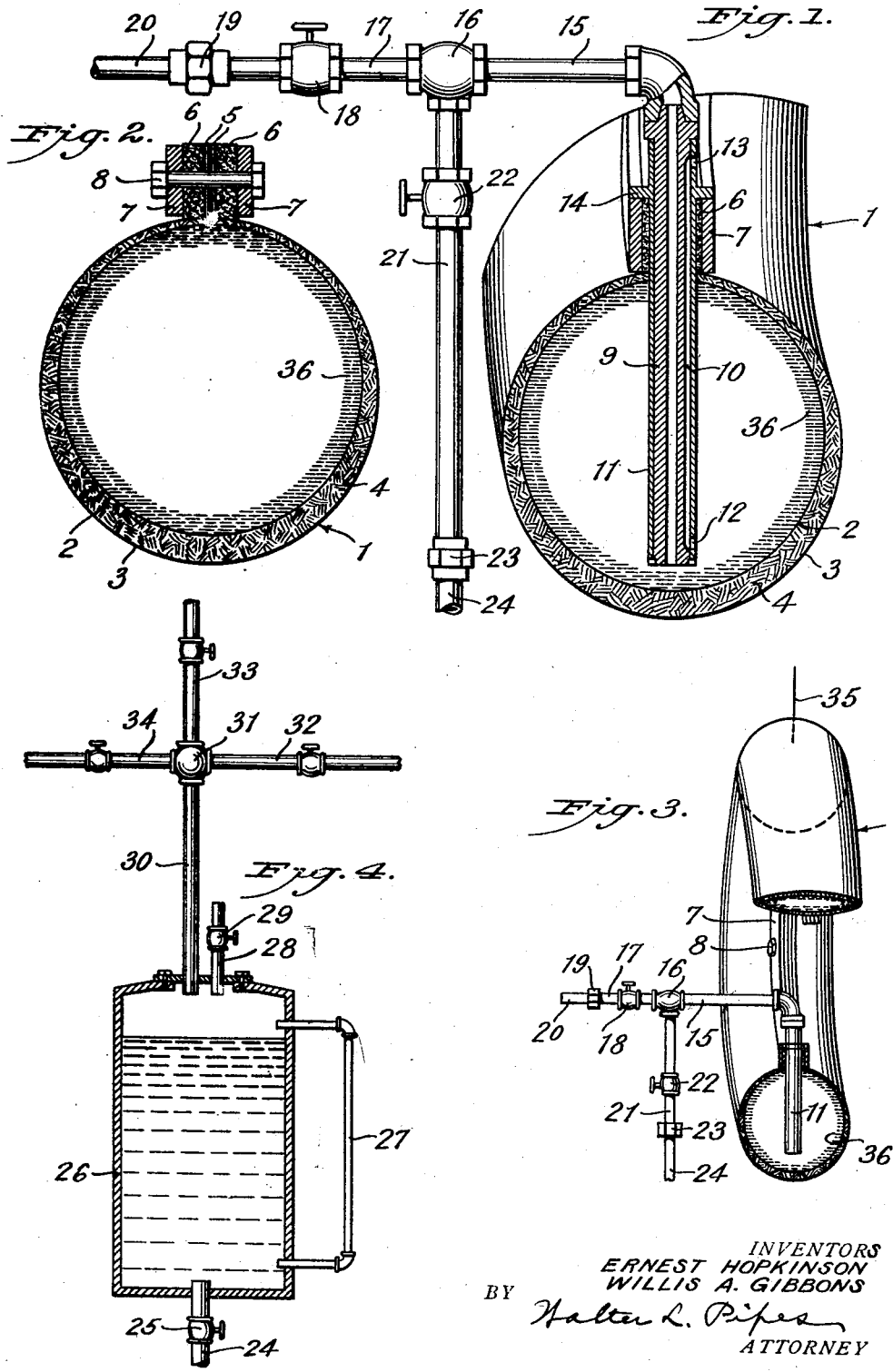

1,808,226

UNITED STATES PATENT OFFICE

ERNEST HOPKINSON, OF NEW YORK, AND WILLIS A. GIBBONS, OF LITTLE NECK, LONG ISLAND, NEW YORK, ASSIGNORS TO MORGAN & WRIGHT, OF DETROIT, MICHIGAN, A CORPORATION OF MICHIGAN

RUBBER TUBE

Original application filed June 23, 1925, Serial No. 38,966. Divided and this application filed October 10, 1928. Serial No. 311,462.

This invention relates to the manufacture of hollow rubber articles, and more particularly tubes in the form of a complete annulus such as inner tubes used with pneumatic casings in ordinary motor vehicles. The present application is a division of our application Serial No. 38,966, filed June 23, 1925.

In the manufacture of inner tubes, by way of illustration, it is generally the practice today to roll the calendered stock around two and one-half or three and one-half convolutions about a pole or mandrel, to then tape the ends and/or the body of the tube so as to confine the stock under more or less pressure, then vulcanize the tubes, and after stripping from the pole splice the ends together. This old practice requires the use of rubber composition that has been through many and costly processes including coagulation, washing, breaking down, compounding, calendering, etc.

The present invention contemplates the direct manufacture of inner tubes and similar articles, in the shape of the completed article, from latex or other aqueous dispersions of rubber. It aims to produce a tube with improved qualities and more cheaply than any heretofore manufactured. It aims to obviate all splicing and other operations required where for instance inner tubes are first made in straight or incomplete annular form and the free ends subsequently united to complete the article. It insures the production of a tube without inherent unequal tensions likely to cause canting of the valve stem, heretofore vexatious to automobile manufacturers in their assemblage of tubes and casings. It also aims to avoid undesired inequalities in wall thickness such as caused by the prior art use of cross wrappers during vulcanization. These are some of the advantages of the invention. Others will appear in connection with the detailed description following.

With the preferred embodiment of the invention in mind, and without intention to limit its scope more than is required by the prior art, it consists essentially in providing a mold or form, with the property of permitting the passage of water and preventing the passage of rubber and leaving thereon a deposit of rubber, out of porous materials such as unglazed porous non-vitreous earthenware or fibrous materials, and depositing insoluble constituents from a water dispersion of rubber thereon in the desired formation and of a desired wall thickness directly from the dispersion, drying the rubber or rubber compound so deposited, and ultimately completely vulcanizing the deposit. The dispersion may be a natural latex having a natural, decreased or increased rubber content, and if desired partially or completely vulcanized; or there may be used an artificial latex formed by making a dispersion of any suitable solid unvulcanized or vulcanized rubber. The latex may be, and preferably is, compounded to yield a rubber composition having suitable strength, resistance to abrasion, and other qualities requisite to satisfy the requirements of the finished product. The term "latex" is therefore employed in the claims with the above definition in mind. The latex is also preferably treated in such manner that its water content may be more readily withdrawn and its insoluble constituents will more readily deposit from the dispersion onto the desired water permeable form. After drying the deposited thickness of rubber may be stripped from the porous form or fabric which is preferably coated with starch or other adhesion preventing agent to facilitate stripping of the rubber from the mold.

For a detailed disclosure of the nature and objects of the invention reference is had to the accompanying specification and drawings illustrating apparatus for carrying out an embodiment of the invention, in which drawings, Fig. 1 is a broken sectional perspective showing an embodiment of apparatus for making an inner tube in a complete annular or jointless form;

Fig. 2 is a cross section through the form and deposit;

Fig. 3 is a broken away detail view; and

Fig. 4 is a sectional view of a latex supply means.

In the making of an endless tube by the present process, an endless form 1 is provided, which may be of any suitable water permeable material, that shown in the drawings being made with inner and outer fabric layers 2 and 3 having an interposed filler 4 of fibrous material. This filler may be gradually reduced in thickness from the outer to the inner periphery of the form and at its inner periphery the fabric layers are extended radially inwardly to form flaps, as shown at 5. Over these flaps suitable washers or rings 6 of felt or similar material are disposed, and the flaps and felt rings are secured together by any suitable clamping means, such as the rings 7 of metal or other material bolted together by means of the bolts 8. Inserted through the form, preferably on its inner periphery, is a tube 9 provided with an exterior longitudinal groove or channel 10 extending within and without the form, and rotatably disposed on the tube is a sleeve 11 having aligned openings 12 and 13 adjacent its ends, which openings may be brought into and out of registry with the channel 10 for a purpose to be later described. The sleeve 11 is provided with a flange 14 by means of which it may be conveniently turned. The tube 9 has its lower end spaced from the inner wall of the form 1 a distance slightly greater than the thickness of deposit desired. At its outer end the tube 9 is connected to a pipe 15 leading into a T 16, and leading from a second opening in the T is a pipe 17 controlled by a valve 18, the pipe having a quick detachable connection 19 with an air or other gaseous fluid supply pipe 20. Also leading from the T 16 is a pipe 21 provided with a valve 22 and having a quick detachable connection 23 with a latex supply pipe 24. The pipe 24 is provided with a valve 25 (Fig. 4) and leads into latex tank 26 provided with a sight gauge 27. The tank is also provided with a filling inlet 28 controlled by a valve 29. Leading from the upper part of the latex tank is a pipe 30 connected to a cross coupling 31, into an arm of which a valved pipe 32 leads, this pipe being connected with any suitable means for producing a vacuum. Also leading into the coupling 31 is a valve controlled vent pipe 33. The remaining arm of the coupling is connected to a valve controlled pipe 34 for supplying air or other gaseous medium.

In operation the tank 26 is first filled with latex, and this latex, as before stated, is preferably treated in such manner as to increase its filterability, that is, to cause it to deposit its rubber and any added compounding constituents at a greatly increased rate on the surface of a permeable material with which it may be in contact. Examples of the manner in which this increased filterability may be obtained are given as follows, but it is obvious that any other suitable means for obtaining the desired result may be obtained.

Ordinary ammonia preserved latex is freed of its ammonia content and to the latex is then added ½% phenol and .06% trisodium phosphate. Using the above treated latex the following compound is then made up:

100 parts rubber as latex.
1 part zinc oxide.
2 parts precipitated sulphur.
½ part oxy normal butyl thiocarbonic acid disulphide.
¼ part dibenzylamine.
1¾ parts glue.
1½ parts solvent naphtha.

In mixing the above compound the various ingredients added to the latex are all incorporated in the form of emulsions. The zinc oxide and sulphur are mixed with water to make a thick mush and then added to a water solution of glue and run through a paint mixer. The oxy normal butyl thiocarbonic acid disulphide is mixed in some solvent naphtha and then emulsified with a water solution of glue to which a small amount of sodium oleate has been added. The dibenzlamine is emulsified in the same manner as the oxy normal butyl thiocarbonic acid disulphide. After mixing up the compound it is allowed to stand at room temperature for about one month. At the end of this time such a mixture is vulcanized, thickens somewhat, and its filterability is markedly increased. For example when filtered through fabric such as underwriter's hose fabric the vulcanized latex gave a deposit of .082 inches overnight. The above illustrates one method of increasing filterability of latex by vulcanization in a specific manner.

Another example in which latex is treated to increase its filterability is as follows: Latex is first treated to remove a large part of its water soluble constituents and the following compound then made up:

100 parts rubber as latex containing 33% solids.
80 parts Gilder's whiting.
20 parts mineral flour.
3½ parts collodidal sulphur.
1 part zinc oxide.
1 part glue.
½ part zinc dimethyldithiocarbamate.

The fillers are added in the form of a water paste and enough concentrated ammonia is added to the mix to make 1% of the ammonia. Enough water is added to make a total of 145 parts water. Such a compounded latex in two hours deposited a layer .069 inches thick. In this case the filterability of latex is increased by the addition of fillers.

At the start of the operation, the valve in pipe 32 is first opened and a vacuum applied to withdraw air from the body of the latex.

The valve in pipe 32 is then closed and those in pipes 34, 24 and 21 are opened, and by reason of the air pressure thus introduced on top of the body of latex in tank 26, the latex is forced into the form 1 under pressure. The form at this time may be vertically disposed as shown in Fig. 3, and as the latex enters the form, the air therein escapes through the interstices of the form, and if desired its escape may be assisted by inserting in the top of the outer periphery a hypodermic needle 35. The water and water soluble constituents of the latex then pass through the form to its exterior, leaving on the interior wall of the form a deposit 36 of the solid suspended constituents of the latex. The supply of latex under pressure is kept up until the desired thickness of deposit has been obtained when the supply is shut off, the valve 22 closed, and the coupling 23 disconnected, after which the position of the form and deposited tube 36 is reversed, that is, the part of the form containing tube 9 is brought to the top with the end of the tube pointing upwardly. A small charge of compressed air under light pressure may then be introduced, after which the form is again brought to the position shown in Fig. 3 when the charge of air with the assistance of gravity will force out the unused latex through the tube 9 and pipe 21, the valve 22 being opened at this time. After the form has been emptied, the valve 22 is again closed, the sleeve 11 rotated to bring its openings 12 and 13 in registry with the channel 10 and heated air or other drying medium is supplied through the pipe 20, this air entering the form through the tube 9 and being exhausted therefrom by way of the channel 10. After the drying or drying and vulcanizing is completed the clamps 7 may be removed and the tube 36 taken out. Instead of removing unused latex in the above manner, the form may be kept in the position shown in Fig. 3 and air introduced at the top through the hypodermic needle 35. After completion of the operation, the needle is removed and the freshly laid down deposit 36 immediately closes the opening formed by the needle. It can readily be determined when the desired thickness of the deposit 36 has been obtained by noting on the sight glass 27 the amount of latex which has been used.

If a vulcanized latex has been used, the tube making operation is completed upon the drying of the latex deposit, and all that is necessary is to open the form 1 and remove the tube. Preferably the form before use is coated on its interior wall with starch or other adhesion preventative. If an unvulcanized latex has been used, this may be compounded in such manner that vulcanization may be accomplished either by the ordinary heat cure or by vulcanization at lower temperatures. When the form used contains fabric, there may be a tendency to shrink and collapse during the drying, but allowance may be made for the shrinkage, and by drying under heat and maintaining closed the valved connections, the air within the tube 36 becomes heated and expands and some steam is generated from the moisture by the drying heat, with the result that sufficient pressure is maintained within the tubular deposit 36 to prevent collapsing. Or, prior to heating, or during heating, air under slight pressure may be introduced to prevent collapsing and undue shrinkage. The pressure differential during the various operations not only prevents collapse but it aids deposition. Any other suitable means for providing a pressure differential may be used. In the commercial application of the method, it is of course, obvious that a large number of forms will be operated upon at the same time. It will be seen that by the use of our method as above described, an inner tube may be made without any joint and which has no undesired inequalities in thickness.

When making inner tubes by the use of our process the so-called valve patch or valve stem reinforcement of fabric may be incorporated in any suitable manner, for instance during the formation of the tube or by external application at a later stage.

While specific examples of the method have been given and specific apparatus for carrying out the method have been illustrated it is obvious that it is not limited in its application and may be used for forming a wide variety of articles and with the use of various types of apparatus for carrying it out. While in the examples given forms of fibrous material have been illustrated and described, any other suitable permeable material may be used, and a choice of such materials will often depend upon their adaptability for use in making any particular desired article.

Having thus described our invention, what we claim and desire to protect by Letters Patent is:

1. The method of making tubular articles in a complete annulus which comprises supplying an aqueous dispersion of rubber to the interior of a water permeable hollow annular form, depositing suspended solids from said dispersion on the form by withdrawing aqueous matter from the dispersion through said form, drying the deposit, a pressure differential being maintained on opposite sides of the form during said operations, and removing the article.

2. The method of making tubular articles which comprises, supplying rubber latex under pressure to the interior of a water permeable hollow annular form, depositing suspended solids from the latex on the form by withdrawing aqueous matter from the latex through said form, withdrawing unused latex and drying the deposit while maintaining pressure on the interior of the form, and removing the article.

3. The method of making tubular articles in a complete annulus which comprises, supplying rubber latex, treated to increase its filterability, under pressure to the interior of a water permeable hollow annular form, depositing suspended solids from said latex on the form by withdrawing aqueous matter from the latex through the form, withdrawing unused latex and drying and vulcanizing the deposit while maintaining pressure on the interior of the form, and removing the article.

Signed at New York, New York, this 4th day of October, 1928.

ERNEST HOPKINSON.

Signed at New York, New York, this 5th day of October, 1928.

WILLIS A. GIBBONS.